(12) United States Patent
Kitoh et al.

(10) Patent No.: US 6,399,242 B2
(45) Date of Patent: *Jun. 4, 2002

(54) LITHIUM SECONDARY BATTERY

(75) Inventors: Kenshin Kitoh, Nagoya; Teruhisa Kurokawa, Ama-gun; Hiroshi Nemoto, Nagoya, all of (JP)

(73) Assignee: NGK Insulators, Ltd., Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/327,819

(22) Filed: Jun. 8, 1999

(30) Foreign Application Priority Data

Jun. 12, 1998 (JP) .......................................... 10-165216

(51) Int. Cl.[7] .......................... H01M 6/08; H01M 6/10; H01M 2/12
(52) U.S. Cl. ........................ 429/164; 429/94; 429/163; 429/53
(58) Field of Search ........................... 429/164, 94, 53, 429/163

(56) References Cited

U.S. PATENT DOCUMENTS

| | | |
|---|---|---|
| 3,849,868 A | 11/1974 | Jost |
| 3,963,519 A | 6/1976 | Louie |
| 4,629,665 A | 12/1986 | Matsuo ........................ 429/164 |
| 5,571,632 A * | 11/1996 | Teramoto ..................... 429/94 |
| 5,849,431 A | 12/1998 | Kita et al. .................... 429/164 |
| 5,929,600 A | 7/1999 | Hasegawa .................... 429/122 |
| D413,858 S | 9/1999 | Murakami et al. ......... D13/103 |
| 5,962,160 A | 10/1999 | Oyama et al. .............. 429/104 |

FOREIGN PATENT DOCUMENTS

| | | |
|---|---|---|
| EP | 0 771 040 A2 | 2/1997 |
| EP | 0 895 297 A1 | 3/1999 |
| JP | 08-250084 | 9/1996 |
| JP | 09-092338 | 4/1997 |

OTHER PUBLICATIONS

Database WPI, Section Ch, Week 199803, Derwent Publications Ltd, London, GB, AN 1998–030069, XP002141484, and JP 09 289037A (Fuji Photo Film Co. Ltd.) Nov. 4, 1997 *Abstract*.

* cited by examiner

Primary Examiner—Carol Chaney
Assistant Examiner—Tracy Dove
(74) Attorney, Agent, or Firm—Burr & Brown

(57) ABSTRACT

A lithium secondary battery includes an internal electrode body including a positive electrode, a negative electrode, a separator, the positive electrode and the negative electrode being wound via the separator so that the positive electrode and the negative electrode are not brought into direct contact with each other, an organic electrolyte, and a battery case containing the internal electrode body. A pipe is used as the battery case. The lithium secondary battery is excellent in reliability and can be produced at low processing costs.

19 Claims, 3 Drawing Sheets

LITHIUM SECONDARY BATTERY

BACKGROUND OF THE INVENTION AND RELATED ART STATEMENT

The present invention relates to a lithium secondary battery which makes it possible to produce a highly reliable battery in particular preferably to be used for driving a motor of an electric vehicle, etc. at low processing costs.

In recent years, while it is eagerly desired to regulate the emission of exhaust gas including carbon dioxide and other harmful substances with the elevation of environment protection campaign as a background, in the automobile industry, in replacement of automobiles using fossil fuels, such as a vehicle driven by gasoline, the campaign to promote introduction of an electric vehicle (EV) and a hybrid electric vehicle (HEV) has become active.

A lithium secondary battery as a motor-driving battery acting as a key for putting such EV as well as HEV into practical use, is required to have such characteristics as large battery capacity as well as high battery output. Here, large battery capacity means that an absolute value of energy to be stored becomes larger, thus measures must be planned so that the safety at the time of handling as well as charging and discharging may be secured. In addition, for the purpose of obtaining higher output, it is necessary to make the internal resistance of a battery, that is, a value of resistance between a positive output terminal and a negative output terminal, smaller.

Therefore, by making the battery's capacity large, volume per a unit battery, namely the battery size, must be inevitably made larger, and, to a battery case to be used in accordance with this, such mechanical characteristics as well as electric characteristics that secure the above described safety and output are requested.

Here, as for a battery case for a small-sized lithium secondary battery, etc., a case with one-end sealing produced by deep drawing is used as the battery case, but in the case where battery size has been made larger, there is a disadvantage that it is technologically difficult to produce a case by way of deep drawing, and in addition, resulting in highly costs to be incurred.

In addition, as described later, as for a wound-type internal electrode body, it is preferable that current collecting tabs for the positive pole should be connected to one end of the internal electrode body, and current collecting tabs for the negative pole should be connected to the other end thereof respectively from the viewpoint of securing the safety, but in the case where a case with one-end sealing has been used, there was a problem that it was difficult to connect to the case with a plurality of current collecting tabs which have been connected at the time of winding at one end.

SUMMARY OF THE INVENTION

The present invention was made by contemplating the problems of the prior art mentioned above. That is, according to the present invention, there is provided a lithium secondary battery, comprising: an internal electrode body including a positive electrode, a negative electrode, and a separator, the positive electrode and the negative electrode being wound via the separator so that the positive electrode and the negative electrode are not brought into direct contact with each, other,
organic electrolyte, and
a battery case containing the internal electrode body; wherein a pipe is used as the battery case.

In such a lithium secondary battery of the present invention, from the viewpoint of safety, it is preferable that the pipe is arranged to be electrically neutral. In addition, it is preferable that at least one end of the pipe is subjected to cramping processing, with which forming of an external output terminal, etc. becomes easier. Of course, it is especially preferable that both ends of the pipe are subjected to the cramping processing. Moreover, it is preferable to provide a necking portion at an end of the pipe having been subjected to the cramping processing, and is preferable to provide bursting mechanism at least at one end of the battery. With this arrangement, for example, even in the case where the bursting mechanism provided in the battery case has operated as a result of increase in battery's internal pressure due to short circuit having taken place between a positive and a negative electrode of the battery, popping out of the internal electric body from the open portion in the bursting mechanism is prevented.

In addition, if a positive output terminal is arranged to be formed at one end of a battery, and a negative output terminal is arranged to be formed at the other end of the battery, reduction in battery's internal resistance can be planned and preferable since not only is production of battery is simple but also the battery case does not have to be a current path. And, as a material for the battery case, aluminum or aluminum alloy, or stainless steel is preferably selected.

Incidentally, the characteristics of the above described lithium secondary battery of the present invention are preferably adopted as a lithium secondary battery with battery capacity of not less than 5 Ah, and the lithium secondary battery of the present invention is preferably used for an electric vehicle (EV) or for a hybrid electric vehicle (HEV).

DETAILED DESCRIPTION OF PREFERRED EMBODIMENT

Figure 1:
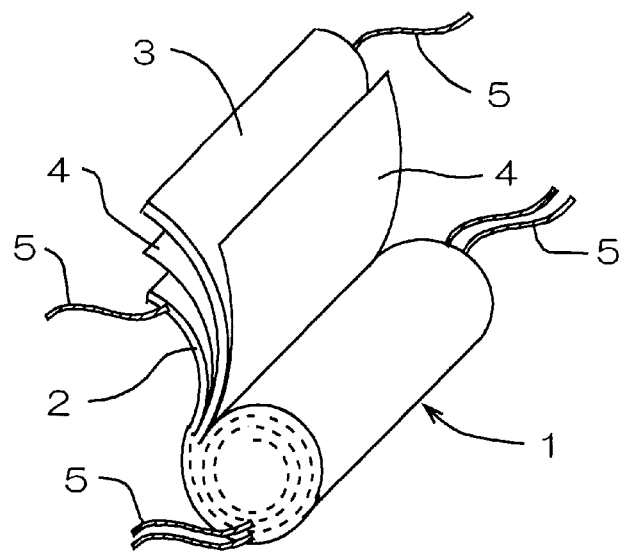
FIG. 1 is a perspective view showing the structure of a wound-type internal electrode body.

An internal electrode body of a lithium secondary battery of the present invention (hereinafter referred to as "battery") comprises a positive electrode, a negative electrode and a separator made of porous polymer film, the positive electrode and the negative electrode being wound for configuration so that the positive electrode and negative electrode are not brought into direct contact with each other via the separator. In particular, as shown in FIG. 1, an internal electrode body 1 is formed by winding a positive electrode 2 and a negative electrode 3 via a separator 4, and tabs 5 are provided respectively for each of the positive and negative electrodes 2, 3 (hereinafter referred to as "electrodes 2, 3"). These tabs 5 can be attached to the electrodes 2, 3 by means such as supersonic welding, etc. at the time when the electrodes 2, 3 are wound together with the separator 4. Incidentally, each tab 5's end part of the opposite side having been connected to the electrodes 2, 3 is attached to an output terminal (not shown) or a current extracting terminal (not shown) being conductive to the output terminal.

As concerns the electrodes 2, 3, foils of metals such as aluminum and titanium for the positive electrode 2 and copper and nickel for the negative electrode 3 are employed as electricity collection bodies, and the electrodes 2, 3 are produced by forming an electrode active material layer with electrode active materials being coated respectively onto metal foils. In addition, the tabs 5 are disposed at one side line of such a metal foil, and in general, those in thin band shape are used so that the part to which the tabs 5 of the electrodes 2, 3 are attached will not swell toward the other periphery when the internal electrode body 1 has been produced. At that time, it is preferable that each tab 5 be disposed at approximately even distance so that a single tab 5 may conduct electricity collection from a constant area in the electrodes 2, 3, and as concerns a material for the tab 5, in many cases, the same material as the metal foil to which the tabs 5 are attached is adopted.

A lithium transition metal compound oxide such as lithium cobalt oxide ($LiCoO_2$), lithium nickel oxide ($LiNiO_2$), or lithium manganese oxide ($LiMn_2O_4$) is used as a positive active material to be used for production of the positive electrode 2. Incidentally, in order to improve the conductivity of these positive active materials, it is preferably conducted to mix with an electrode active material, a carbon powder such as acetylene black, or graphite powder. On the other hand, for the negative active materials, an amorphous carbon material such as soft carbon or hard carbon, or carbon powder such as artificial graphite or natural graphite is used. These electrode active materials are transformed into a slurry, coated onto the electricity collection body and stuck, thus the electrodes 2, 3 are produced.

As the separator 4, it is preferable to use one having a three-layer configuration in which a polyethylene film having lithium ion permeability and including micropores has been sandwiched between porous polypropylene films having lithium ion permeability. This serves also as a safety mechanism in which when the temperature of internal electrode body 1 is raised, the polyethylene film is softened at about 130° C. so that the micropores are collapsed to control the movement of lithium ions, that is, the battery reaction. And with this polyethylene film being sandwiched between the polypropylene films having a softening temperature higher than the said polyethylene film, it becomes possible to prevent the direct contact between the electrodes 2, 3.

As electrolyte a carbonic acid ester family such as ethylene carbonate (EC), diethyl carbonate (DEC), and dimethyl carbonate (DMC), and a nonaqueous organic electrolyte in which one or more kinds of lithium fluoride complex compound such as $LiPF_6$, and $LiBF_4$ or lithium halide such as $LiClO_4$ as an electrolyte are dissolved in a single solvent or mixed solvent of organic solvents such as propylene carbonate (PC), γ-butyrolactone, tetrahydrofuran, and acetonitrile are preferably used.

Figure 2:
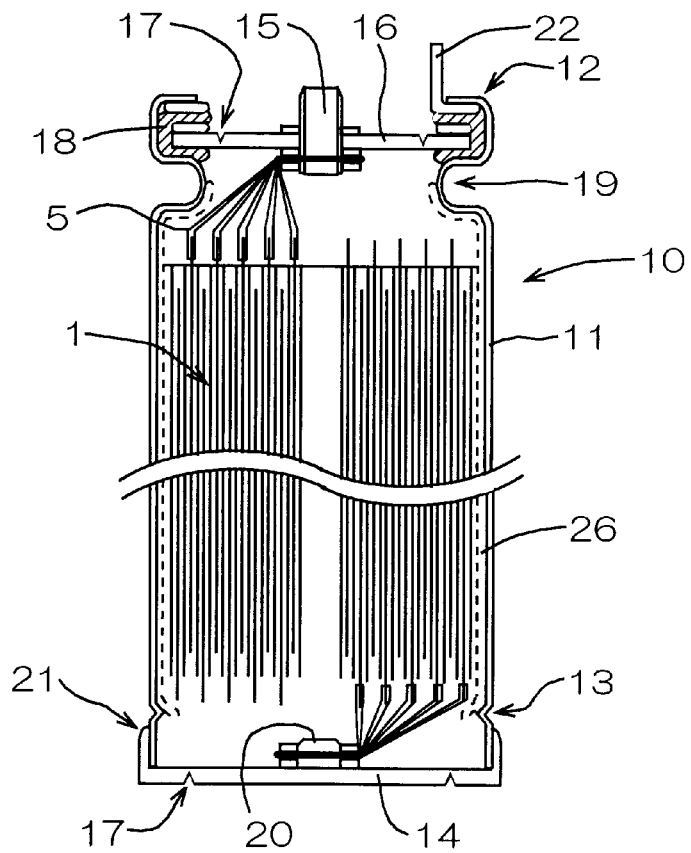
FIG. 2 is a cross-sectional view showing one embodiment according to the lithium secondary battery of the present invention.

As a material for a battery case in the lithium secondary battery of the present invention to be produced by using such configurating members, a pipe is used. FIG. 2 is a cross-sectional view showing one embodiment according to the lithium secondary battery of the present invention, and one end (upper end) of a pipe 11 has been subjected to crimping (crimping processing portion 12). In addition, at the other end (lower end), a drawing portion 13 is provided in a pipe 11 so that the internal electrode body 1 may not slide downward to fall, but instead of providing the drawing portion 13, an insulating spacer may be placed between a lower end cap 14 (lower cap 14) and the internal electrode body 1 to control the movement of the internal electrode body 1 inside a battery 10. Incidentally, at the boundary between the internal wall of the pipe 11 and the internal electrode body 1, an insulating film 26 is disposed so that any short circuit between the internal electrode body 1 and the pipe 11 may take place. But, the insulation between the pipe 11 and the internal electrode body 1 may be secured by the separator 4 of the internal electrode body 1.

Taking a further look at the structure of the battery 10 in detail, first, at the upper part of the battery 10, the tabs 5 attached to the internal electrode body 1 are connected to an output terminal 15 which is provided so as to pierce through an upper cap 16. Here, if the tabs 5 are integrated into one body in advance by welding, cramping, and/or using an eyelet before being connected to the output terminal 15, negative effects due to such factors as oxidized films being generated on the surface of each tab 5 consequently to cause variation in resistance of each tab 5 can be removed, which is preferable.

As the upper cap 16, metal materials are usually used, but it is also possible to use hard plastic material such as bakelite. In addition, a groove-type bursting mechanism 17 is provided in the upper cap 16 so that the internal pressure of the battery is released to the atmospheric pressure if the internal pressure has been increased. That upper cap 16 to which the output terminal 15 has been attached is attached in such a manner that one end of the pipe 11 is sealed by crimping processing via an insulating sealing member 18 to fill the gap between the upper cap 16 and the pipe 11. If at the time of the crimping processing a necking portion 19 has been provided to the pipe 11, then, the internal electrode body 1's movement inside the battery 10 can be controlled, and moreover, crimping processing becomes easy to be conducted.

On the other hand, with respect to the lower end of the battery 10, the tabs 5 are connected to a current extracting terminal 20 similarly to the upper end, and the lower cap 14 to which the current extracting terminal 20 has been attached is junctioned with the pipe 11 by welding at an welded portion 21, thereby the end portion has been sealed. The lower cap 14 in this case is made of metal and is to have configuration so that a current path is secured from the current extracting terminal 20 to an output terminal 22 having been provided at the upper end of the battery 10 via the pipe 11. Here, the output terminal 22 is to be electrically insulated against the upper cap 16 and the output terminal 15 due to the sealing member 18. Incidentally, a groove-type pressure release mechanism 17 is also provided in the lower cap 14, but it will do if the pressure release mechanism 17 is provided to at least either the upper cap 16 or the lower cap 14.

Figure 3:
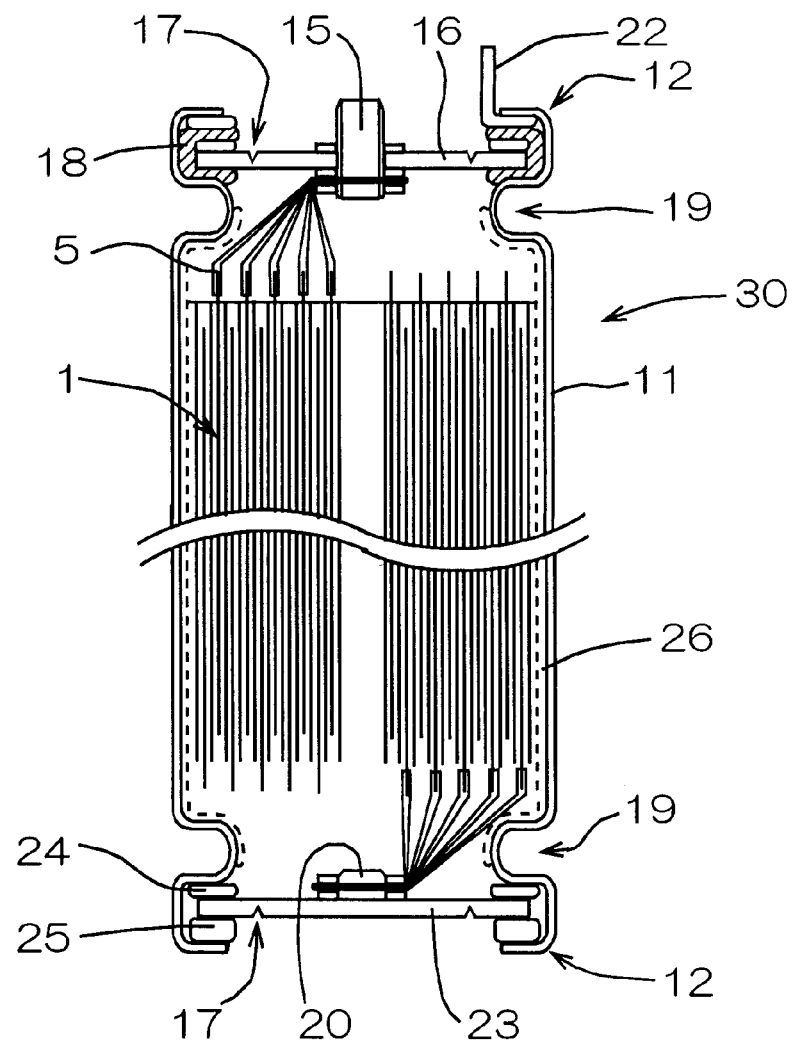
FIG. 3 is a cross-sectional view showing another embodiment according to the lithium secondary battery of the present invention.

FIG. 3 is a cross-sectional view showing another embodiment according to the lithium secondary battery of the present invention. A battery 30 has the same upper end configuration as the battery 10 which has been shown in FIG. 2, but also the lower end has been subjected to crimping processing similarly to the upper end and moreover provided with a necking portion 19. Here, as a lower cap 23 the one made of metal has been used, and the lower end of the pipe 11 has been sealed via seal rings 24, 25, having been disposed at the upper and lower side of the lower cap 23. Since at least one of the two seal rings 24, 25 is made of metal, the conduction between the current extracting terminal 20 and the output terminal 22 via the pipe 11 can be secured. Thereby, the number of seal rings may be one, and in the case where two seal rings are used, an insulator such as rubber and polymer, etc. having elasticity can be used for one seal ring.

Thus, by providing the necking portions 19 at both ends of the pipe 11, namely, at both ends of the battery 30, it will become possible to prevent such an accident that the internal electrode body 1 pops out from the open portion in the pressure release mechanism 17 even if the internal pressure of the battery 30 has been increased and the bursting mechanism 17 has been operated due to erroneous use such as excess discharge, etc., making higher safety to be secured. Moreover, in the case where both ends of the pipe 11 are sealed by crimping processing, there are advantages such that the flexibility in designing the structure of end portions of the battery 30 will increase, and there is an advantage that disposition of not only the bursting mechanism 17 but also other safety mechanisms will become easier.

Figure 4:
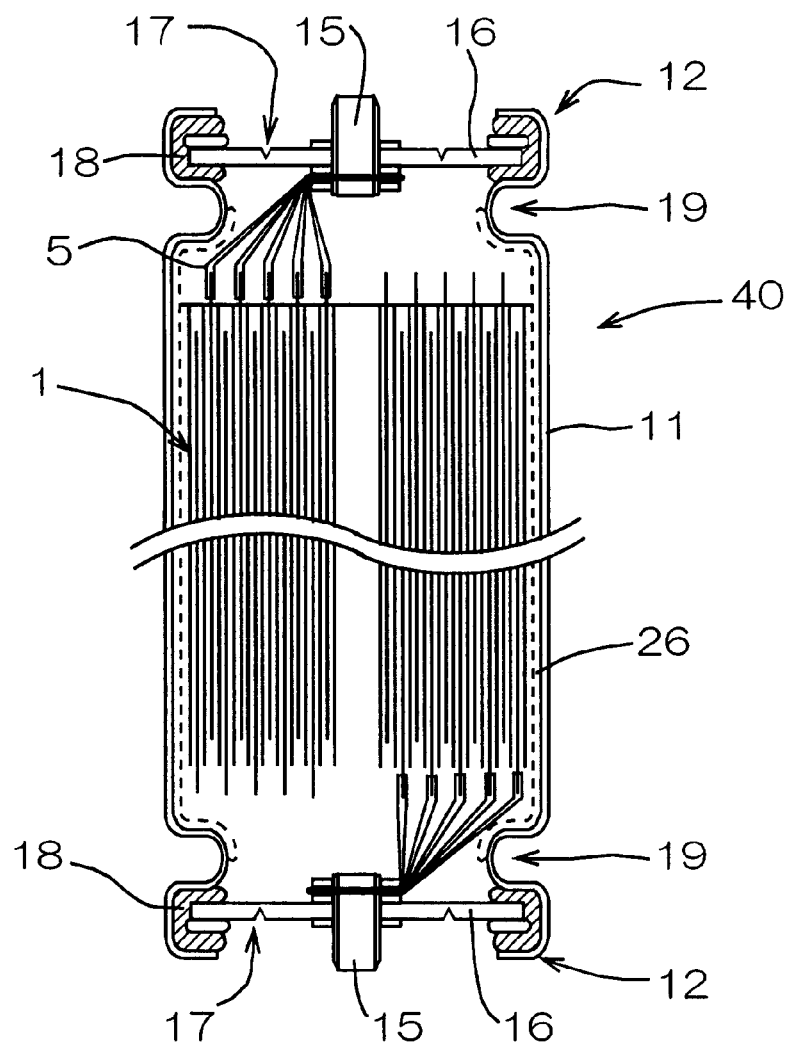
FIG. 4 is a cross-sectional view showing still another embodiment according to the lithium secondary battery of the present invention.

Now, FIG. 4 is a cross-sectional view showing still another embodiment according to the lithium secondary battery of the present invention. At the upper part of a battery 40, the tabs 5 attached to the internal electrode body 1 are connected to the output terminal 15 which has been provided so as to pierce through the upper cap 16, and the upper cap 16 to which the output terminal 15 has been attached has a configuration so as to have been attached in such a manner that one end of the pipe 11 is sealed by crimping processing via an insulating sealing member 18 to fill the gap between the upper cap 16 and the pipe 11, and the lower end has the same structure as the upper end, too. That is, the output terminal for the positive pole has been disposed at one end of the battery 40, and the output terminal for the negative pole has been provided at the other end. Thus, in the case where both ends of a battery have been sealed by crimping processing, similarly to the case of the before-described battery 30, current extraction from the internal electrode body 1 will become easier to conduct. And, in case of a large capacity battery, it becomes possible to decrease the internal resistance without causing any problems related to manufacturing process since it is easy to connect the output terminal 15, etc. to the tabs 5 even in larger quantity to be disposed.

Incidentally, in the battery 40, although both ends of the pipe 11 have been subjected to crimping processing similarly to the above described battery 30, unlike the battery 30, the pipe 11 is not used as a current path and is kept in an electrically neutral state. Thus, by not using any pipe 11 as a current path, the internal resistance of the battery is reduced. In addition, in the case where both positive and negative output terminals 15, 22 have been disposed at one end of a battery like in the case of the batteries 10, 30, accidents such that tools, etc. might short-circuit between the output terminals 15, 22 by mistake may easily happen at the time of handling, for example at the time when current cables are attached to the output terminals 15, 22, etc., but on the contrary, in the battery 40, it becomes possible to remove such risk and improve the safety at the time of handling.

In the batteries of the above described present invention having various structures, a material for the battery case, namely a material for the pipe 11, is preferably aluminum, aluminum alloy or stainless steel. The pipes 11 with various diameters made of such materials are being marketed, and therefore are easily available and cheap, and moreover, make it possible to produce highly reliable batteries, nevertheless, at low costs since as described above it is possible to proceed with processing of the end portions. Incidentally, although aluminum refers to pure aluminum, it is possible to use without any problems the aluminum with purity of not less than 90%.

The characteristics of the above described lithium secondary battery of the present invention are preferably adopted especially as a large battery with battery capacity of not less than 5 Ah, which, however, do not serve to prevent an application to batteries with not more than such battery capacity. In addition, the lithium secondary battery of the present invention can be preferably used especially for an electric vehicle or for a hybrid electric vehicle, taking advantage of characteristics of its large capacity, low costs and high reliability.

As described above, the lithium secondary battery of the present invention was explained by showing various embodiments, but it goes without saying that the present invention will not be limited to the above described embodiments. In addition, in the batteries 10, 30, 40 for the above described embodiments, a groove-type mechanism was exemplified as a bursting mechanism, but it goes without saying that the bursting mechanisms (pressure releasing mechanisms) using various metal foils which have been previously disclosed in Japanese Patent Application No. 09-202963 and Japanese Patent Application No. 09-331537 by the present inventors.

As described above, according to a lithium secondary battery of the present invention, such an excellent effect can be achieved that it will become possible to reduce the material cost by using a pipe which is cheap as a battery case material and has wide variety of selection on shape. In addition, the end portion of the pipe can easily be sealed by crimping processing, thus the process cost can be reduced, and furthermore, since it is possible to easily proceed with takeout of the tabs from the internal electrode body and connection to the output terminal, etc., there is an advantage that a wide variety of designing of structure of ends of a battery will become possible. Moreover, a necking portion may be provided in a battery case, thereby such an excellent effect can be achieved that even in the case where a bursting mechanism has operated as a result of increase in battery's internal pressure, popping out of the internal electric body is prevented, thus the safety will be increased.

What is claimed is:

1. A lithium secondary battery, comprising:
an internal electrode body, an organic electrolyte, a casing and first and second end caps, said internal electrode body comprising a positive electrode, a negative electrode, and a separator, said positive electrode and said negative electrode being wound via said separator so that said positive electrode and said negative electrode are not in contact with each other,
whereby an outer structure comprising said end caps and said casing air-tightly encloses an entirety of a space defined within said outer structure, said internal electrode body and said electrolyte being within said space,
said casing having at least two necking portions, said two necking portions being on opposite axial sides of said internal electrode body, each of said necking portions comprising a region of smaller circumference than circumferences of portions of said casing adjacent to said necking portion,
a body of said casing being solely made of a single pipe.

2. The lithium secondary battery according to claim 1, wherein the pipe is electrically neutral.

3. The lithium secondary battery according to claim 1, wherein at least one end of the pipe is crimped.

4. The lithium secondary battery according to claim 2, wherein at least end of the pipe is crimped.

5. The lithium secondary battery according to claim 1, wherein a bursting mechanism is provided at least at one end of the battery.

6. The lithium secondary battery according to claim 2, wherein a bursting mechanism is provided at least at one end of the battery.

7. The lithium secondary battery according to claim 1, wherein a positive output terminal is provided at one end of the battery and a negative output terminal is provided at the other end of the battery.

8. The lithium secondary battery according to claim 2, wherein a positive output terminal is provided at one end of the battery and a negative output terminal is provided at the other end of the battery.

9. The lithium secondary battery according to claim 1, wherein a material for the battery case is aluminum or aluminum alloy, or stainless steel.

10. The lithium secondary battery according to claim 1, wherein battery capacity is set not less than 5 Ah.

11. The lithium secondary battery according to claim 2, wherein battery capacity is set not less than 5 Ah.

12. An electric vehicle or a hybrid electric vehicle, comprising a lithium secondary battery according to claim 11.

13. The electric vehicle or hybrid electric vehicle according to claim 12, wherein said pipe is electrically neutral.

14. The electric vehicle or hybrid electric vehicle according to claim 12 wherein at least one end of the pipe is crimped.

15. The electric vehicle or hybrid electric vehicle according to claim 12, wherein a bursting mechanism is provided at least at one end of said battery.

16. The lithium secondary battery according to claim 1 wherein said first end cap is attached to a first end of said casing, and said second end cap is attached to a second end of said casing.

17. The lithium secondary battery according to claim 1, wherein said outer structure further comprises an insulating sealing member, said first end cap being sealed to a first end of said casing through said insulating sealing member, said second end cap being sealed to a second end of said casing.

18. The lithium secondary battery according to claim 1, wherein said outer structure further comprises a pair of insulating sealing members, said first end cap being sealed to a first end of said casing through a first of said insulating sealing members, said second end cap being sealed to a second end of said casing through a second of said insulating sealing members.

19. The lithium secondary battery according to claim 1, wherein said pipe has at least two crimped portions, and each of said two necking portions is adjacent to a crimped portion of said pipe.

* * * * *